(12) United States Patent
Glick et al.

(10) Patent No.: US 11,441,702 B1
(45) Date of Patent: Sep. 13, 2022

(54) FLUIDIC VALVE

(71) Applicant: META PLATFORMS TECHNOLOGIES, LLC, Menlo Park, CA (US)

(72) Inventors: Casey Glick, Redmond, WA (US); John Lutian, Bellevue, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 506 days.

(21) Appl. No.: 16/407,716

(22) Filed: May 9, 2019

(51) Int. Cl.
| *F16K 7/12* | (2006.01) |
| *F16K 99/00* | (2006.01) |
| *F16K 41/12* | (2006.01) |
| *F16K 7/17* | (2006.01) |
| *F16K 31/165* | (2006.01) |
| *F16K 31/126* | (2006.01) |

(52) U.S. Cl.
CPC ...... *F16K 99/0057* (2013.01); *F16K 99/0025* (2013.01); *F16K 7/12* (2013.01); *F16K 7/17* (2013.01); *F16K 31/126* (2013.01); *F16K 31/165* (2013.01); *F16K 41/12* (2013.01); *F16K 2099/0094* (2013.01)

(58) Field of Classification Search
CPC .............. F16K 99/0057; F16K 99/0025; F16K 2099/0094; F16K 41/12; F16K 31/165; F16K 31/126; F16K 7/12; F16K 7/17
USPC .......... 116/264; 137/115.17, 315.05, 505.36, 137/505.37, 859; 251/331, 335.2, 5, 61.1
See application file for complete search history.

(56) References Cited

U.S. PATENT DOCUMENTS

| 2,989,282 | A | * | 6/1961 | Ira | F16K 7/17 251/61.1 |
| 3,844,529 | A | * | 10/1974 | Brandt, Jr. | F15C 3/04 251/61.1 |
| 4,712,580 | A | * | 12/1987 | Gilman | A61M 16/20 137/512.15 |
| 4,712,583 | A | * | 12/1987 | Pelmulder | A61M 39/24 137/852 |
| 5,010,925 | A | * | 4/1991 | Atkinson | F16K 15/147 137/846 |
| 5,971,024 | A | * | 10/1999 | Penny | F16K 15/144 137/859 |
| 6,089,272 | A | * | 7/2000 | Brand | A61M 39/24 137/859 |
| 6,644,944 | B2 | * | 11/2003 | Karp | F04B 43/043 417/566 |
| 7,013,726 | B1 | * | 3/2006 | Drummond | A61M 16/20 417/413.2 |
| 7,721,763 | B2 | * | 5/2010 | Choksi | F16K 15/144 137/859 |

(Continued)

*Primary Examiner* — Minh Q Le
(74) *Attorney, Agent, or Firm* — FisherBroyles, LLP

(57) ABSTRACT

The disclosed computer-implemented method may include a fluidic device comprising a chamber, an inlet port coupled to the chamber and configured to convey fluid to the chamber, and an outlet port coupled to the chamber and configured to convey the fluid from the chamber. The fluidic device may also have a restricting region that (1) is dimensioned to restrict a flow of the fluid through the outlet port when the pressure in the chamber is below a threshold level and (2) is configured to move in a manner that allows a flow rate of the fluid through the outlet port to increase when pressure in the chamber reaches the threshold level.

20 Claims, 12 Drawing Sheets

(56) References Cited

U.S. PATENT DOCUMENTS

| | | | | |
|---|---|---|---|---|
| 8,528,591 | B2* | 9/2013 | Pirk | F16K 99/0057 137/493.8 |
| 8,922,355 | B2* | 12/2014 | Kusuura | G06F 3/00 340/407.1 |
| 10,591,933 | B1* | 3/2020 | Keller | F15C 3/00 |
| 2006/0147329 | A1* | 7/2006 | Tanner | F04B 43/046 417/505 |
| 2007/0215224 | A1* | 9/2007 | Furukawa | F15C 5/00 137/833 |
| 2007/0251592 | A1* | 11/2007 | Christenson | F16K 99/0057 137/859 |
| 2010/0078584 | A1* | 4/2010 | Van Den Bijgaart | F16K 7/16 251/331 |
| 2011/0020140 | A1* | 1/2011 | Park | F04B 19/006 417/48 |
| 2013/0032210 | A1* | 2/2013 | Johnstone | F04B 19/006 137/1 |
| 2014/0166133 | A1* | 6/2014 | Fu | F16K 99/0057 137/565.01 |
| 2017/0300115 | A1* | 10/2017 | Kerr | G06F 3/011 |
| 2018/0158367 | A1* | 6/2018 | Russomanno | F15D 1/007 |
| 2019/0145530 | A1* | 5/2019 | Kotani | F04B 45/10 137/859 |
| 2019/0353157 | A1* | 11/2019 | Mou | F16K 99/0057 |
| 2021/0088155 | A1* | 3/2021 | Lu | F16K 99/0015 |

* cited by examiner ary embodiments and are a part of the specification.
FLUIDIC VALVE

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
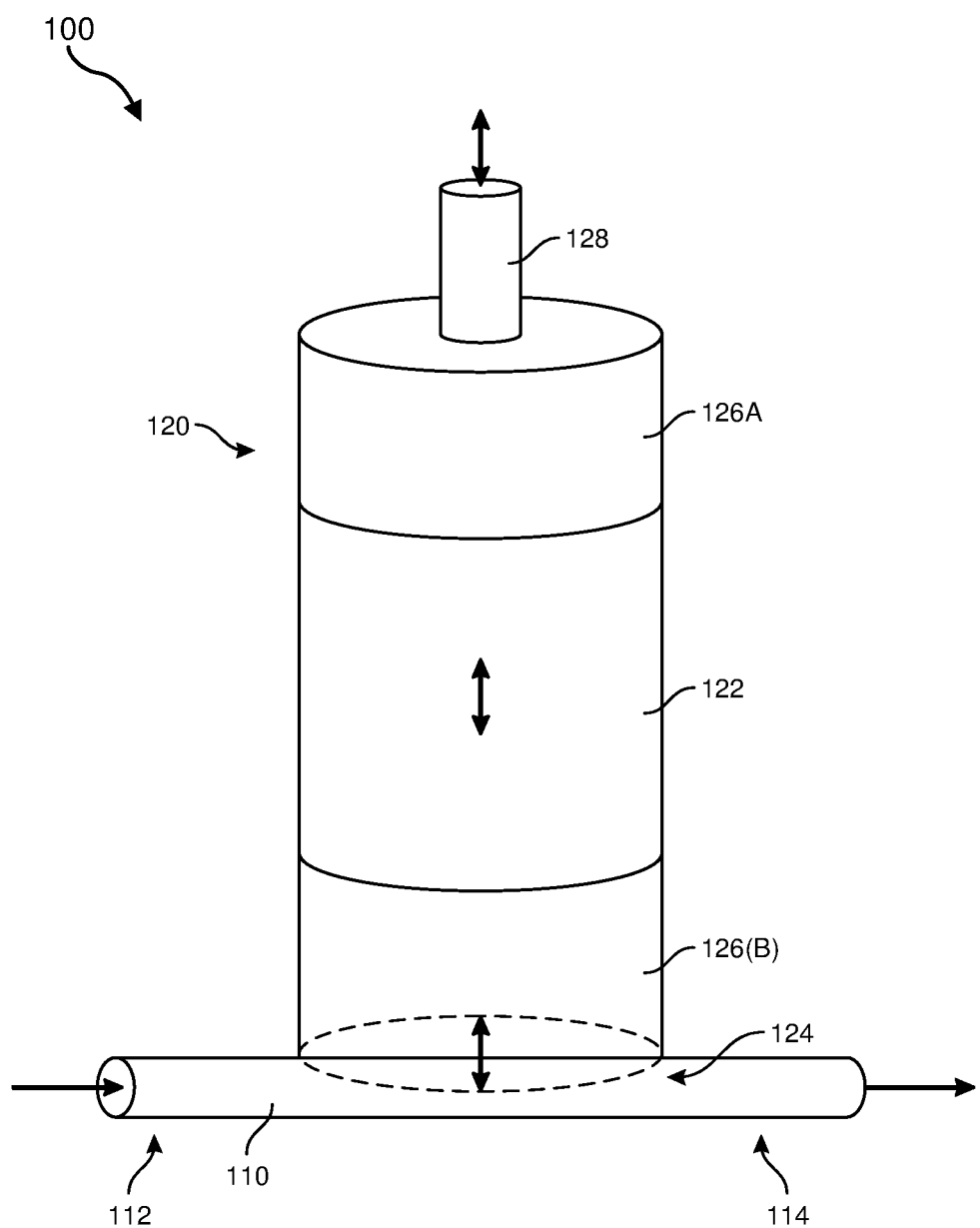
FIG. 1 is an illustration of an exemplary fluidic control system that may be used in connection with embodiments of this disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Microfluidic systems are small mechanical systems that involve the flow of fluids. Microfluidic systems can be used in many different fields, such as biomedical, chemical, genetic, biochemical, pharmaceutical, haptics, and other fields. Conventional microfluidic valves are basic components of microfluidic systems and may be used for stopping, starting, or otherwise controlling the flow of a fluid in a microfluidic system. The disclosed fluidic valves may control the flow of fluid in a microfluidic system in a manner that provides haptic feedback, thereby providing a fluidic tactor. The disclosed fluidic valves may also function as oscillating regulators to downstream devices.

An example fluidic tactor may include a chamber, an inlet port coupled to the chamber and configured to convey input flow to the chamber, and an outlet port coupled to the chamber and configured to convey output flow from the chamber. The fluidic tactor may also include an elastic membrane that is positioned over the outlet port and at least a portion of the chamber such that the elastic membrane blocks at least a portion of the output flow when pressure in the chamber is below a threshold level. The elastic membrane may include an inner surface configured to, when the pressure in the chamber reaches the threshold level, deform in a manner that unblocks the portion of the output flow that was blocked when the pressure in the chamber was below the threshold level. The elastic membrane may also include an outer surface configured to provide haptic feedback.

The fluidic tactor may provide vibratory feedback under a continuous flow of fluid through the inlet port. Under continuous flow, the elastic membrane may periodically block and unblock the output flow, triggering periodic increases and decreases to pressure within the chamber. Periodic increases and decreases to pressure within the chamber may cause the elastic membrane to vibrate and function as a vibrotactor. In some embodiments, a fluidic valve may have a resonating, self-actuating valve structure that outputs fluid in a periodic/pulsing manner that delivers a vibrotactile response through a downstream tactor.

Embodiments of the instant disclosure may provide various features and advantages over traditional vibrotactors. For example, embodiments of this disclosure may enable both fluidic control (as described in connection with FIG. 1) and fluidic actuation (as described in connection with FIGS. 2A-2C, FIGS. 3A-3C, FIGS. 4A-4D, and FIG. 5) of a tactor. Furthermore, as will be described in more detail in connection with FIG. 6, embodiments of this disclosure may provide for efficient and effective fabrication of fluidic tactors. The fluidic tactors described herein may be used in a variety of different types of systems, such as the artificial-reality systems described in relation to FIGS. 7-12.

The present disclosure may include haptic fluidic systems that involve the control (e.g., stopping, starting, restricting, increasing, etc.) of fluid flow through a fluid channel. The control of fluid flow may be accomplished with a fluidic valve. Furthermore, as described in greater detailed below in connection with FIG. 3H, a fluidic valve may be used to regulate a fluidic tactor, may be the tactor itself, or may serve as both a fluidic valve and a fluidic tactor.

FIG. 1 shows a schematic diagram of a fluidic valve 100 for controlling flow through a fluid channel 110, according to at least one embodiment of the present disclosure. Fluid from a fluid source (e.g., a pressurized fluid source, a fluid pump, etc.) may flow through the fluid channel 110 from an inlet port 112 to an outlet port 114, which may be operably coupled to, for example, a fluid-driven mechanism, another fluid channel, or a fluid reservoir.

Fluidic valve 100 may include a gate 120 for controlling the fluid flow through fluid channel 110. Gate 120 may include a gate transmission element 122, which may be a movable component that is configured to transmit an input force, pressure, or displacement to a restricting region 124 to restrict or stop flow through the fluid channel 110. Conversely, in some examples, application of a force, pressure, or displacement to gate transmission element 122 may result in opening restricting region 124 to allow or increase flow through the fluid channel 110. The force, pressure, or displacement applied to gate transmission element 122 may be referred to as a gate force, gate pressure, or gate displacement. Gate transmission element 122 may be a flexible element (e.g., an elastomeric membrane, a diaphragm, etc.), a rigid element (e.g., a movable piston, a lever, etc.), or a combination thereof (e.g., a movable piston or a lever coupled to an elastomeric membrane or diaphragm).

As illustrated in FIG. 1, gate 120 of fluidic valve 100 may include one or more gate terminals, such as an input gate terminal 126A and an output gate terminal 126B (collectively referred to herein as "gate terminals 126") on opposing sides of gate transmission element 122. Gate terminals 126 may be elements for applying a force (e.g., pressure) to gate transmission element 122. By way of example, gate terminals 126 may each be or include a fluid chamber adjacent to gate transmission element 122. Alternatively or additionally, one or more of gate terminals 126 may include a solid component, such as a lever, screw, or piston, that is configured to apply a force to gate transmission element 122.

In some examples, a gate port 128 may be in fluid communication with input gate terminal 126A for applying a positive or negative fluid pressure within the input gate terminal 126A. A control fluid source (e.g., a pressurized fluid source, a fluid pump, etc.) may be in fluid communication with gate port 128 to selectively pressurize and/or depressurize input gate terminal 126A. In additional embodiments, a force or pressure may be applied at the input gate terminal 126A in other ways, such as with a piezoelectric element or an electromechanical actuator, etc.

In the embodiment illustrated in FIG. 1, pressurization of the input gate terminal 126A may cause the gate transmission element 122 to be displaced toward restricting region 124, resulting in a corresponding pressurization of output gate terminal 126B. Pressurization of output gate terminal 126B may, in turn, cause restricting region 124 to partially or fully restrict to reduce or stop fluid flow through the fluid channel 110. Depressurization of input gate terminal 126A may cause gate transmission element 122 to be displaced away from restricting region 124, resulting in a corresponding depressurization of the output gate terminal 126B. Depressurization of output gate terminal 126B may, in turn, cause restricting region 124 to partially or fully expand to allow or increase fluid flow through fluid channel 110. Thus, gate 120 of fluidic valve 100 may be used to control fluid flow from inlet port 112 to outlet port 114 of fluid channel 110.

Figure 2A:
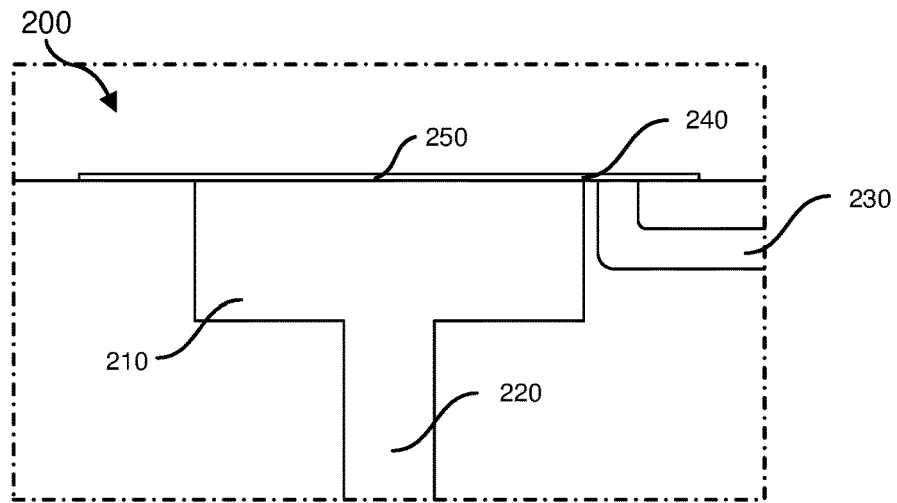
FIGS. 2A-2C are cross-sectional diagrams of an exemplary fluidic vibrotactor.
Figure 2B:
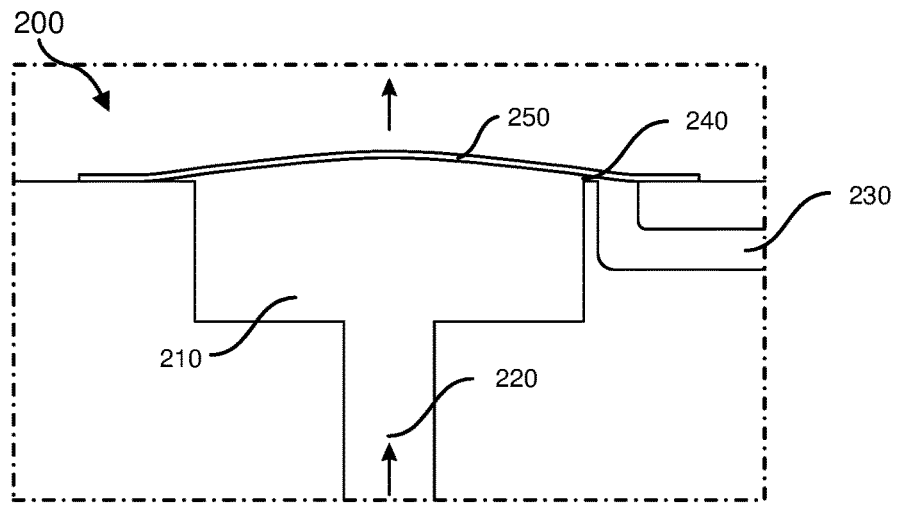
Figure 2C:
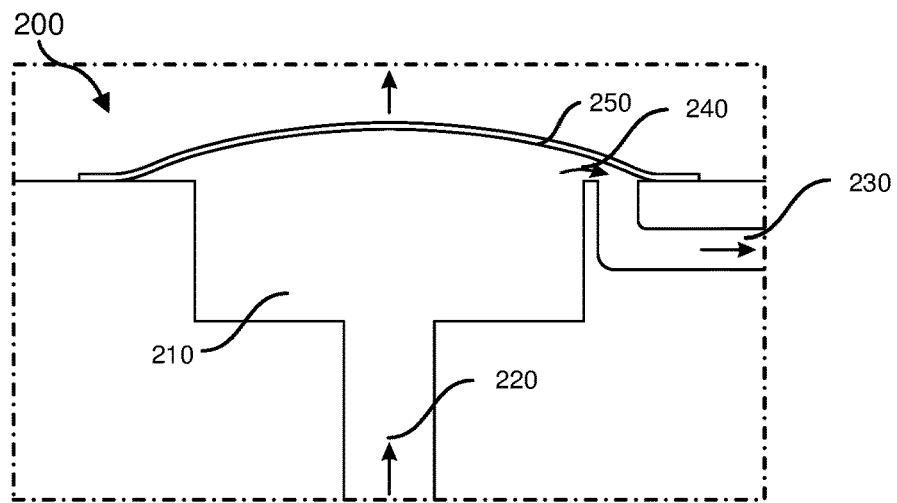

Fluidic valve 100 may be used to control fluidic tactors, such as vibrotactor 200 in FIGS. 2A-2C. As shown, vibrotactor 200 may include a chamber 210, an inlet port 220 coupled to chamber 210 and configured to convey fluid to chamber 210, and an outlet port 230 coupled to chamber 210 and configured to convey fluid from chamber 210. The configuration of chamber 210, inlet port 220, and outlet port 230 is merely an example of the shapes, dimensions, and port configurations covered by this disclosure. Chamber 210, inlet port 220, and/or outlet port 230 may be arranged in any other suitable configuration and/or may have any suitable shape.

Inlet port 220 may be coupled to any fluidic source or mechanism that can provide a pressurized fluid (e.g., gas (e.g., air, nitrogen, etc.) or liquid (e.g., water, oil, etc.)) to vibrotactor 200. By way of example and not limitation, the fluid source coupled to inlet port 220 may be or include a pressurized reservoir, a fan, a pump, a piston system, etc. In some embodiments, inlet port 220 may be coupled to the fluid source via one or more fluidic valves, such as fluidic valve 100.

Inlet port 220 may convey fluid from a fluidic source to chamber 210, and a restricting region 240 may control the flow of the fluid from chamber 210 through outlet port 230. Restricting region 240 may be (1) dimensioned to restrict a flow of the fluid through outlet port 230 when the pressure in chamber 210 is below a threshold level, (2) configured to move in a manner that allows a flow rate of the fluid through outlet port 230 to increase when pressure in chamber 210 reaches the threshold level, and (3) positioned such that movement of restricting region 240 triggers tactile feedback.

Restricting region 240 may be configured to restrict and allow different fluid rate flows in variety of ways. For example, restricting region 240 may include any suitable type or form of gate, valve, or other element capable of controlling a flow rate from chamber 210 via outlet port 230. In some embodiments, restricting region 240 may include an elastic membrane 250 that deforms to decrease a restriction of output flow through outlet port 230. In the examples shown in FIGS. 2A-2C, elastic membrane 250 may block, fully or partially, a flow of fluid from chamber 210 through outlet port 230. While pressure in chamber 210 is relatively low, elastic membrane 250 may be in a relaxed state, as shown in FIG. 2A. A fluid source may cause fluid to flow into chamber 210 via inlet port 220, resulting in an increase of pressure within chamber 210. This increase in pressure may cause an outward deformation of elastic membrane 250, as shown in FIG. 2B. As pressure reaches a threshold level within chamber 210, elastic membrane 250 may release the restriction on output flow, as shown in FIGS. 2B and 2C.

In some embodiments, fluidic valve 100 may operate, at least in part, through resonance. For example, inertia of elastic membrane 205 and/or any other suitable blocking mechanism may push the membrane to close the restricting region in situations where the equilibrium pressure may be insufficient to do so. Additionally or alternatively, fluidic valve 100 may exhibit aeroelastic flutter. For example, membrane 250 may flutter as fluid passes through chamber 210. Aeroelastic flutter, in some examples, generally refers to a self-excited structural oscillation at a frequency where energy is extracted from a fluid stream by motion of a membrane or other element.

In some embodiments, the outward expansion and/or movement of membrane 250 may be used to create a haptic response for a user. For example, all or a portion of elastic membrane 250 may be coupled to a cutaneous interface that is dimensioned to contact the skin of a wearable-device user. Elastic membrane 250 may be coupled to a cutaneous interface in any suitable manner. For example, tactor 200 may be incorporated into a wearable device and positioned such that, when the device is being worn, the cutaneous interface makes contact with a user (e.g., such that outward deformation of elastic membrane 250 pushes the cutaneous interface against the skin of the user).

A cutaneous interface may generally include any suitable material or mechanism that makes contact with the skin of a user. In some embodiments, a cutaneous interface may be formed as an integral part of elastic membrane 250 (e.g., a coating on elastic membrane 250, an outer surface of elastic membrane 250, etc.). The cutaneous interface may be formed from the same material or a different material than that of elastic membrane 250. In some embodiments, a cutaneous interface may be attached to (e.g., adhered to, chemically bonded to, fastened to) elastic membrane 250. As an example, the cutaneous interface may be a material that may feel comfortable to a user against their skin (e.g., a cotton material, a polyester material, etc.) that is attached to or otherwise held against at least a portion of elastic membrane 250. In some embodiments, a portion of tactor 200 other than elastic membrane 250 may be attached to a wearable device in a manner that holds elastic membrane 250 against a cutaneous interface that is intended to be in contact with the skin of a user.

Elastic membrane 250, as part of tactor 200, may provide tactile feedback in any suitable type or form of wearable device, including any of the wearable devices discussed herein. For example, tactor 200 may be incorporated into haptic device 810 (i.e., a glove) as one or more of vibrotactile devices 840, into band elements 1032 of haptic device 1030 (e.g., a wrist band), and/or into any other haptic wearable device.

In addition to or instead of being incorporated into wearable devices, tactor 200 may be incorporated into one or more controllers (e.g., handheld game controllers), seats (e.g., gaming chairs), or other devices that may be used in conjunction with creating an augmented or virtual reality for a user.

Figure 3A:
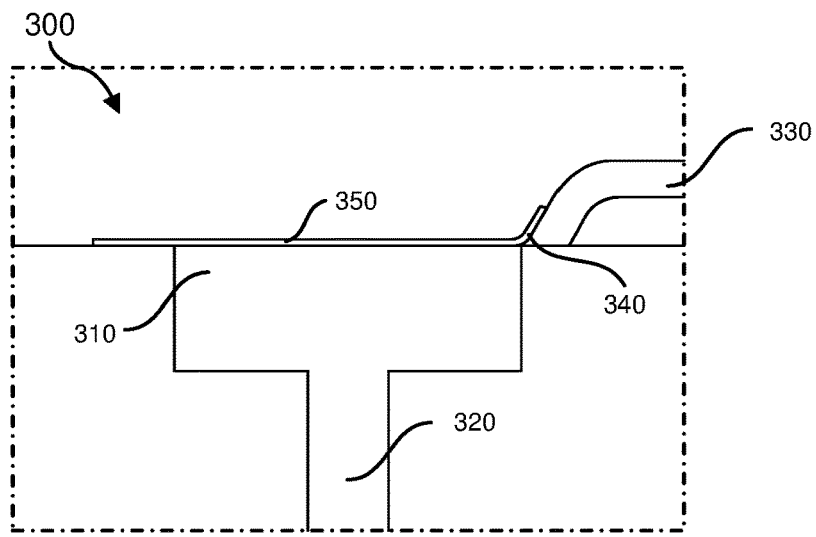
FIGS. 3A-3C are cross-sectional diagrams of another exemplary fluidic vibrotactor.
Figure 3B:
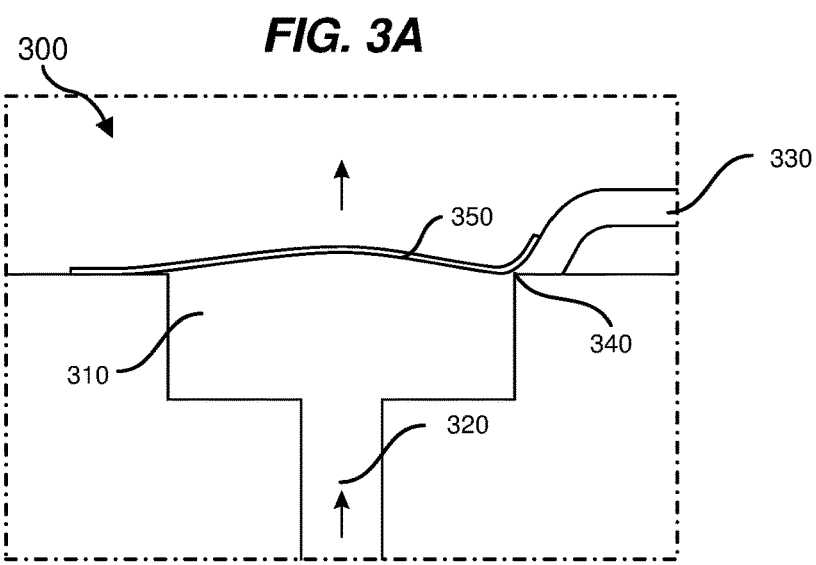
Figure 3C:
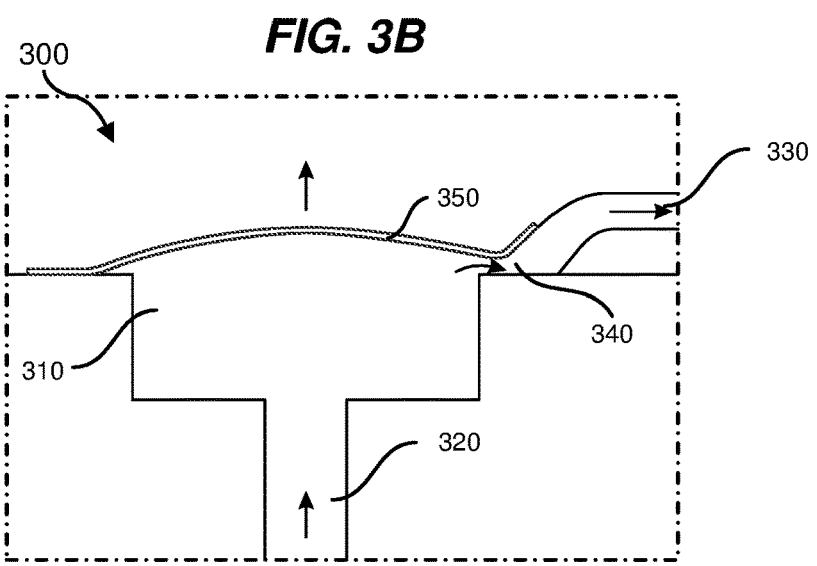

As shown in FIGS. 2A-2C, flexible membrane 250 may be coupled to (e.g., adhered to, chemically bonded to, fastened to) tactor 200 such that flexible membrane 250, when relaxed, covers or blocks all or a portion of outlet port 230. As an alternative, as shown in FIGS. 3A-3C, a tactor 300 may include a flexible membrane 350 that is formed as part of outlet port 330. In other words, outlet port 330 may be coupled to and/or form as a part of an opening in elastic membrane 350. In this example, when the pressure in chamber 310 is below a threshold level, fluid flow through outlet port 330 may be at least partially blocked by the elastic membrane. In either example, flexible membranes 250 and 350 may also be referred to as gate elements since tactors 200 and 300 may function as fluidic valves. Furthermore, flexible membranes 250 and 350 may be formed of any suitable material, such as a polymer (e.g., an elastomeric material, such as a polysiloxane material).

Returning to FIGS. 3A-3C, tactor 300, like tactor 200, may include a chamber 310, an inlet port 320, and an outlet port 330. A flow rate through outlet port 330 may be limited by elastic membrane 350 at restricting region 340. A fluidic control system (e.g., a controller) may control a flow rate of the fluid at inlet port 320 in tactor 300 or inlet port 220 in tactor 200. The controller may be coupled to an artificial reality system (see, e.g., system 500, system 600, system 700, system 800, environment 900, and/or system 1000) that creates an artificial reality for the user.

The controller, which may be implemented as controller 625 or controller 650 in system 600, may be configured to change the flow rate at the inlet port in response to activity within an artificial reality. For example, the controller may direct a fluidic valve, such as valve 100 in FIG. 1, to open to allow fluid to flow through inlet port 220 or 320 into chambers 210 or 310. In some embodiments, the controller may be programmed to cause the flow rate to be at least substantially continuous over a period of time (e.g., fractions of a second, seconds, etc.) such that the following cycle recurs throughout the period of time: (1) the pressure in chamber 210 or 310 increases due to restricted flow at the restricting region, (2) the pressure in chamber 210 or 310 reaches the threshold and causes elastic membrane 250 or 350 to move in the manner that allows the flow rate of the fluid to increase through outlet port 230 or 330, (3) the flow rate of the fluid through outlet port 230 or 330 causes the pressure in chamber 210 or 310 to fall below the threshold level, (4) the decrease in pressure in chamber 210 or 310 causes restricting region 240 or 340 to move or reshape in a manner that reduces the flow rate of the fluid through outlet port 230 or 330, and (5) periodic movement of restricting region 240 or 340 causes elastic membrane 250 or 350 to vibrate and function as a vibrotactor.

Restricting regions 240 and/or 340 may be dimensioned and/or configured in a variety of ways. In some embodiments, restricting region 240 or 340 may be configured such that a change in input flow affects a frequency of the vibration of elastic membrane 250 or 350 and/or a magnitude of the vibration of elastic membrane 250 or 350. Frequency and magnitude of vibration of membranes 250 and/or 350 may also be affected by a dimension of inlet port 220, a dimension of outlet port 230, and/or a dimension of chamber 210.

Figure 4A:
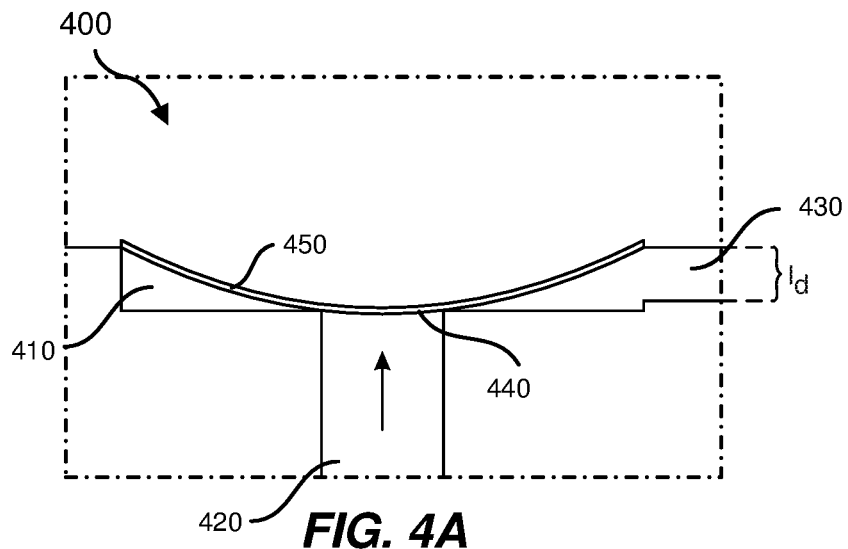
FIGS. 4A-4D are cross-sectional diagrams of another exemplary fluidic vibrotactor.
Figure 4B:
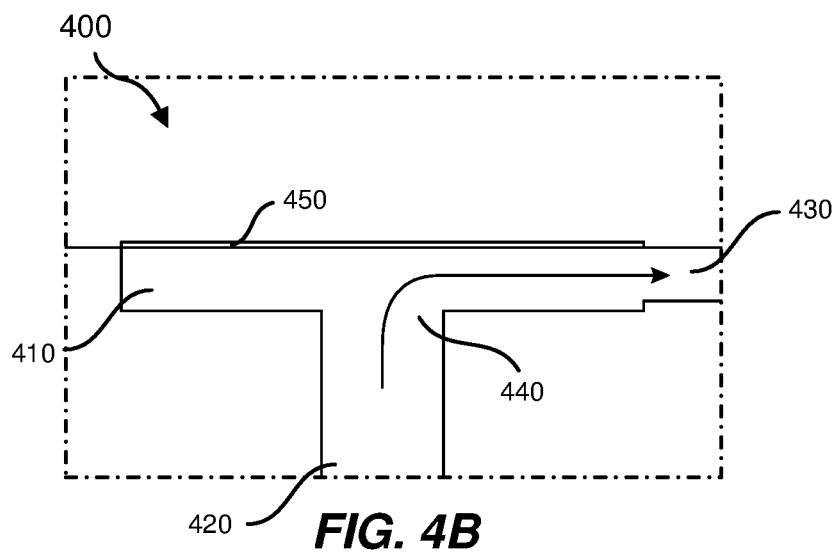
Figure 4C:
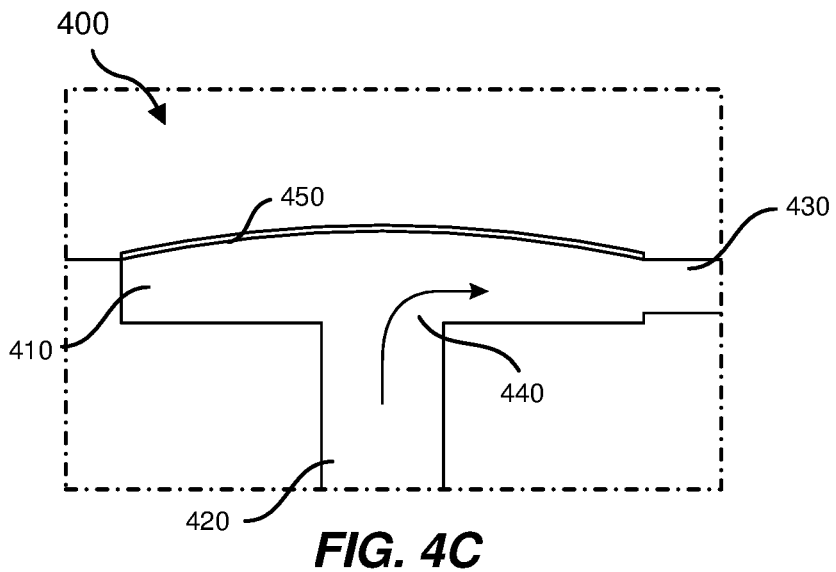

In some embodiments, as shown in FIGS. 4A, 4B, 4C, and 4D, a membrane 450 may block an inlet port 430. A force may be applied downward on membrane 450 to close inlet port 430 at a restricting region 440. Additionally or alternatively, membrane 450 may be preconfigured to have the shape shown in FIG. 4A in a relaxed state. Increased pressure at inlet port 430 may move membrane 450 in an upward direction, as shown in FIG. 4B, allowing fluid to flow from inlet port 420 into a chamber 410 and out of outlet port 430. FIG. 4C illustrates how membrane 450 may extend outward, which may result in a rebound effect that causes oscillation (i.e., repetition of deformation) of membrane 450 as membrane 450 cycles through the positions in FIGS. 4A through 4D and then back to the position shown in FIG. 4A. Various factors may affect the oscillation frequency of membrane 450 and/or the amount of force needed to initiate oscillation. These factors may include, without limitation, one or more dimensions of chamber 410, the mass of membrane 450, the elasticity of membrane 450, the size of inlet port 420, the size of outlet port 430, etc.

Figure 4D:
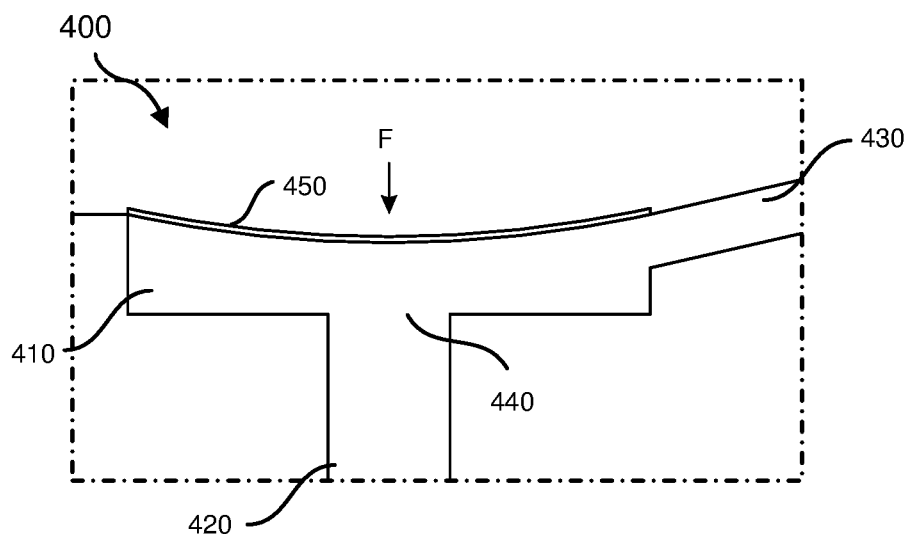

FIG. 4D shows an example where a second gate terminal provides a downward force (F) on membrane 450. Force F may be applied via a fluid, electromechanical actuation, an external stimulus (e.g., pressure applied by a user), and/or in any other suitable manner. Force F may increase the closing force of membrane 450 against inlet port 420, which may change actuation pressure and/or vibration frequency of membrane 450.

Figure 5:
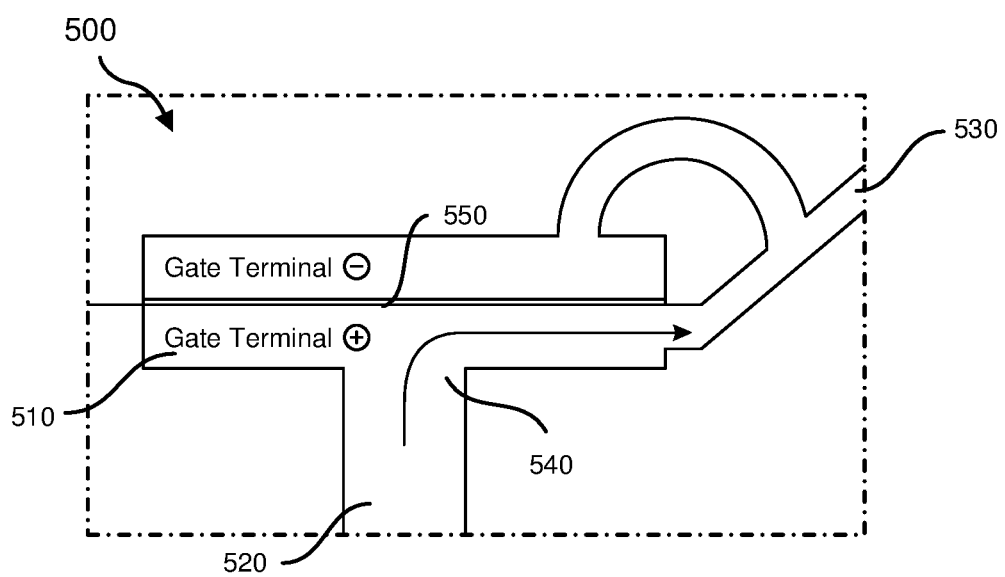
FIG. 5 is a cross-sectional diagram of an exemplary fluidic valve.

FIG. 5 shows a modification to tactor 400 to create a valve 500 that may or may not function as a tactor. As shown in FIG. 5, a negative gate terminal may be fluidically connected to an outlet port 530 such that pressure at outlet port 530 acts on a membrane 550 in two directions. When an inlet port 520 is closed at a restricting region 540, pressure at outlet port 530 may be low enough that the negative gate terminal has a low pressure and the positive gate terminal has a high pressure. Then, when inlet port 520 is opened, the pressure at the positive terminal in chamber 510 may drop and the pressure at the negative terminal may increase, creating an additional downward restoring force. This may tend to increase the vibration frequency of membrane 550.

As noted, some embodiments, such as the valve shown in FIG. 5, could be used as a resonating self-actuating valve structure, where various properties of the valve mechanism are used to regulate output flow of fluid in a periodic and pulsing fashion, which could be used to deliver oscillating fluidic flow and/or pressure to downstream devices. In such embodiments, the downstream devices may be tactors or devices that may be controlled by an oscillating pressure.

Figure 6:
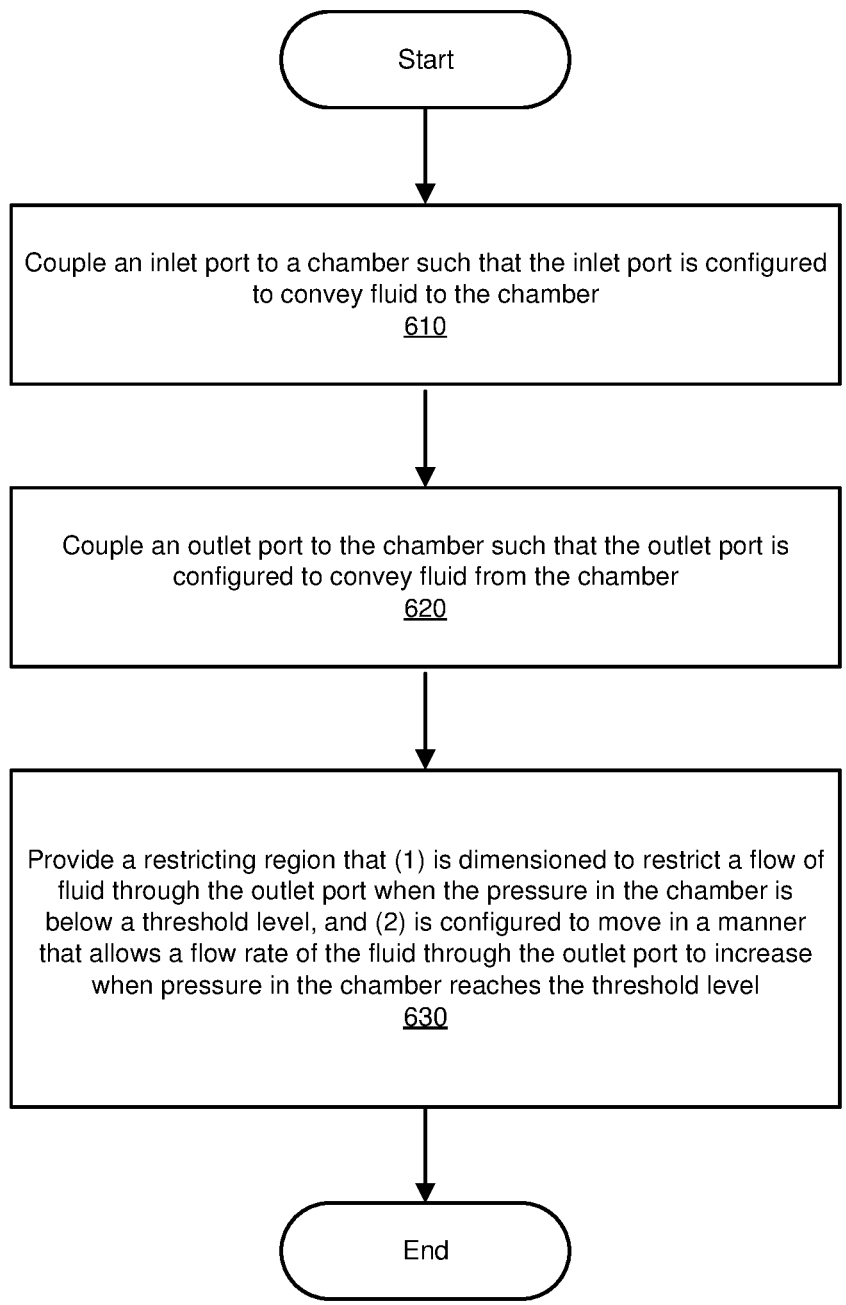
FIG. 6 is a flow diagram of an exemplary method for manufacturing a fluidic vibrotactor.

Valves configured as shown in FIG. 5 can both control the operation of a separator tactor and be tactors themselves. For example, such a valve could function as a tactor, as described in connection with FIGS. 2A-2C, 3A-3C, and 4A-4D, and could also, by controlling downstream pressure, control operation of a downstream tactor. FIG. 6 is a flow diagram of an exemplary method 600 for fabricating, manufacturing, and/or assembling a fluidic tactor. The steps shown in FIG. 6 may be performed by any suitable manufacturing, fabrication, and/or assembly device or system and may be controlled by any suitable type or form of computing device. At step 610, one or more of the systems described herein may couple an inlet port to a chamber such that the inlet port is configured to convey fluid to the chamber. An inlet port may be coupled to a chamber in any suitable manner. In some embodiments, the inlet port and the chamber may be coupled by being formed as part of the same process (e.g., a chemical-vapor deposition ("CVD") process, a plasma-enhanced CVD ("PECVD") process, a diffusion process, mechanical milling, molding, etc). In other embodiments, the inlet port and the chamber may be formed separately and may be coupled by an adhesive, a thermal coupling process, a chemical coupling process, etc. The inlet port may also be coupled to the chamber in any other suitable manner.

At step 620, an outlet port may be coupled to the chamber such that the outlet port is configured to convey fluid from the chamber. The outlet port may be coupled to the chamber in any suitable manner. In some embodiments, the outlet port and the chamber may be coupled by being formed as part of the same process (e.g., a chemical-vapor deposition ("CVD") process, a plasma-enhanced CVD ("PECVD") process, a diffusion process, etc). In other embodiments, the outlet port and the chamber may be formed separately and may be coupled by an adhesive, a thermal coupling process, a chemical coupling process, etc. The outlet port may also be coupled to the chamber in any other suitable manner.

At step 630, a restricting region may be formed, created, or otherwise provided. The restricting region may be formed such that it restricts a flow of the fluid through the outlet port when the pressure in the chamber is below a threshold level. The restricting region may also be configured to move in a manner that allows a flow rate of the fluid through the outlet port to increase when pressure in the chamber reaches the threshold level.

The restricting region may be configured to move in a manner that changes flow rate through an outlet port in a variety of ways. In some embodiments, as discussed in connection with FIGS. 2A-2C and 3A-3C, the restricting region may include an elastic membrane that covers (or partially covers) the outlet port when pressure in the chamber is relatively low. Thus, the restricting region may inhibit output flow when pressure in the chamber is relatively low. As pressure in the chamber increases, the elastic membrane may deform in a manner that allows increased output flow. In other embodiments, the restricting region may include a rigid or semi-rigid gate that covers all or a portion of the outlet port when pressure in the chamber is low and that moves to allow increased output flow when pressure in the chamber increases. The restricting region may be configured to move in a manner that changes flow rate through an outlet port in any other suitable manner.

The restricting region may further be positioned such that movement of the restricting region provides tactile feedback. Such a restricting region may be provided by forming or coupling a flexible membrane to the chamber and over the outlet port (e.g., as shown in FIGS. 2A-2C) or as part of the outlet port (e.g., as shown in FIGS. 3A-3C). As another example, the restricting region may include a rigid or semi-rigid surface that moves in a way that provides haptic feedback as pressure in the chamber increases or decreases. The restricting region may also be positioned to provide tactile feedback in any other suitable manner.

In some embodiments, method 600 may also include the step of coupling the restricting region to a cutaneous interface of a wearable device. In such embodiments, positioning the restricting region to provide haptic feedback may involve incorporating the tactor into a wearable device in a manner that enables movement of the restricting region to provide haptic feedback to a user wearing the wearable device. For example, a flexible membrane of the restricting region may be coupled to a material of a glove or a wrist band. As another example, a coating suitable for contact with human skin may be deposited on the membrane.

Method 600 may also involve coupling a fluidic source channel to the inlet port. Any type or form of fluidic source may be coupled to the inlet port. For example, a fluidic valve, such as fluidic valve 100, may be part of a fluidic control system and may be coupled to the inlet port.

Embodiments of the present disclosure may include or be implemented in conjunction with various types of artificial reality systems. Artificial reality is a form of reality that has been adjusted in some manner before presentation to a user, which may include, e.g., a virtual reality, an augmented reality, a mixed reality, a hybrid reality, or some combination and/or derivative thereof. Artificial-reality content may include completely generated content or generated content combined with captured (e.g., real-world) content. The artificial-reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial-reality systems may be implemented in a variety of different form factors and configurations. Some artificial reality systems may be designed to work without near-eye displays (NEDs), an example of which is augmented-reality system 700 in FIG. 7. Other artificial reality systems may include a NED that also provides visibility into the real world (e.g., augmented-reality system 800 in FIG. 8) or that visually immerses a user in an artificial reality (e.g., virtual-reality system 900 in FIG. 9). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 7:
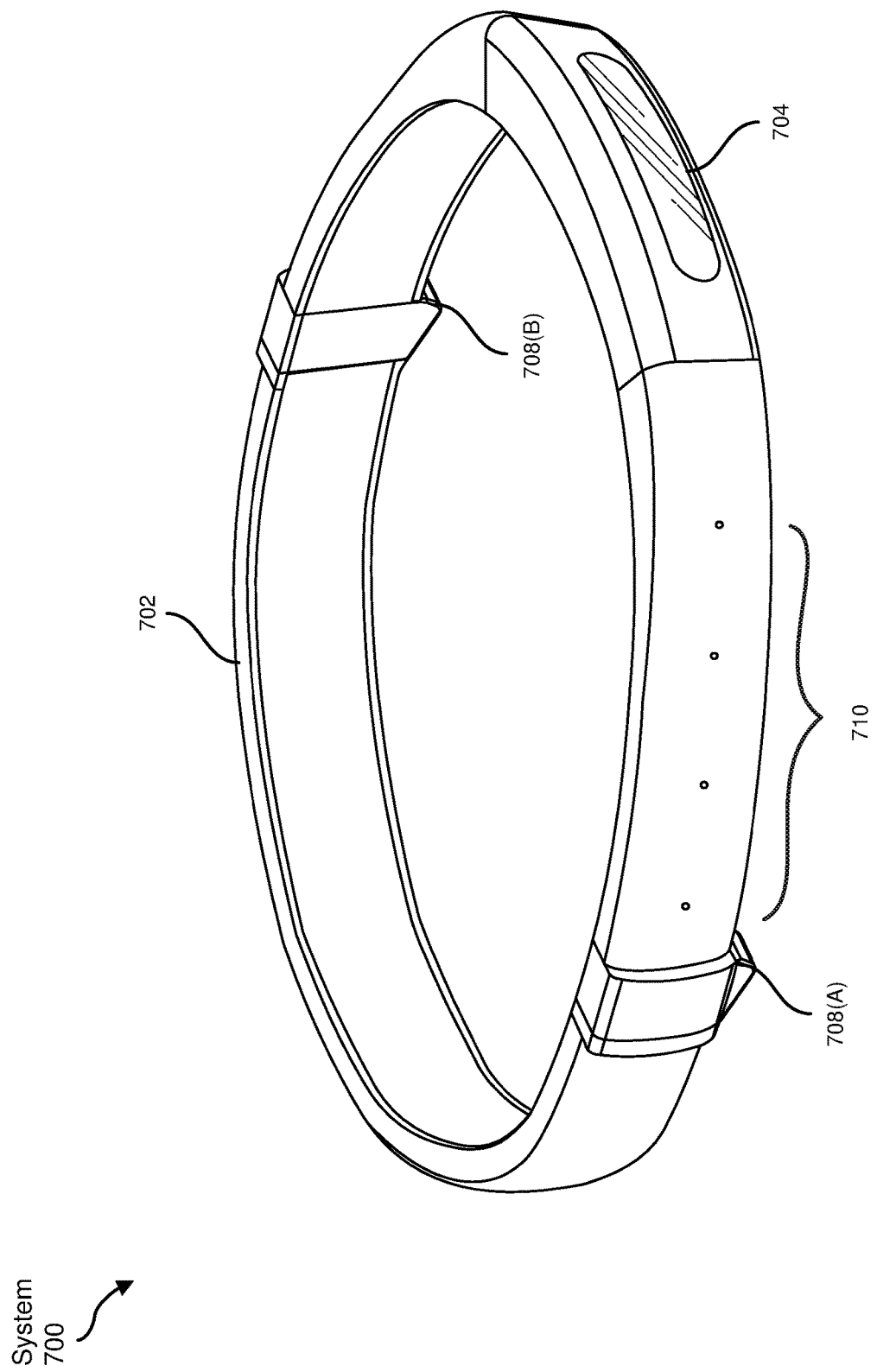
FIG. 7 is a diagram of an exemplary artificial-reality headband that may be used in connection with embodiments of this disclosure.

Turning to FIG. 7, augmented-reality system 700 generally represents a wearable device dimensioned to fit about a body part (e.g., a head) of a user. As shown in FIG. 7, system 700 may include a frame 702 and a camera assembly 704 that is coupled to frame 702 and configured to gather information about a local environment by observing the local environment. Augmented-reality system 700 may also include one or more audio devices, such as output audio transducers 708(A) and 708(B) and input audio transducers 710. Output audio transducers 708(A) and 708(B) may provide audio feedback and/or content to a user, and input audio transducers 710 may capture audio in a user's environment.

As shown, augmented-reality system 700 may not necessarily include a NED positioned in front of a user's eyes. Augmented-reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While augmented-reality system 700 may not include a NED, augmented-reality system 700 may include other types of screens or visual feedback devices (e.g., a display screen integrated into a side of frame 702).

Figure 8:
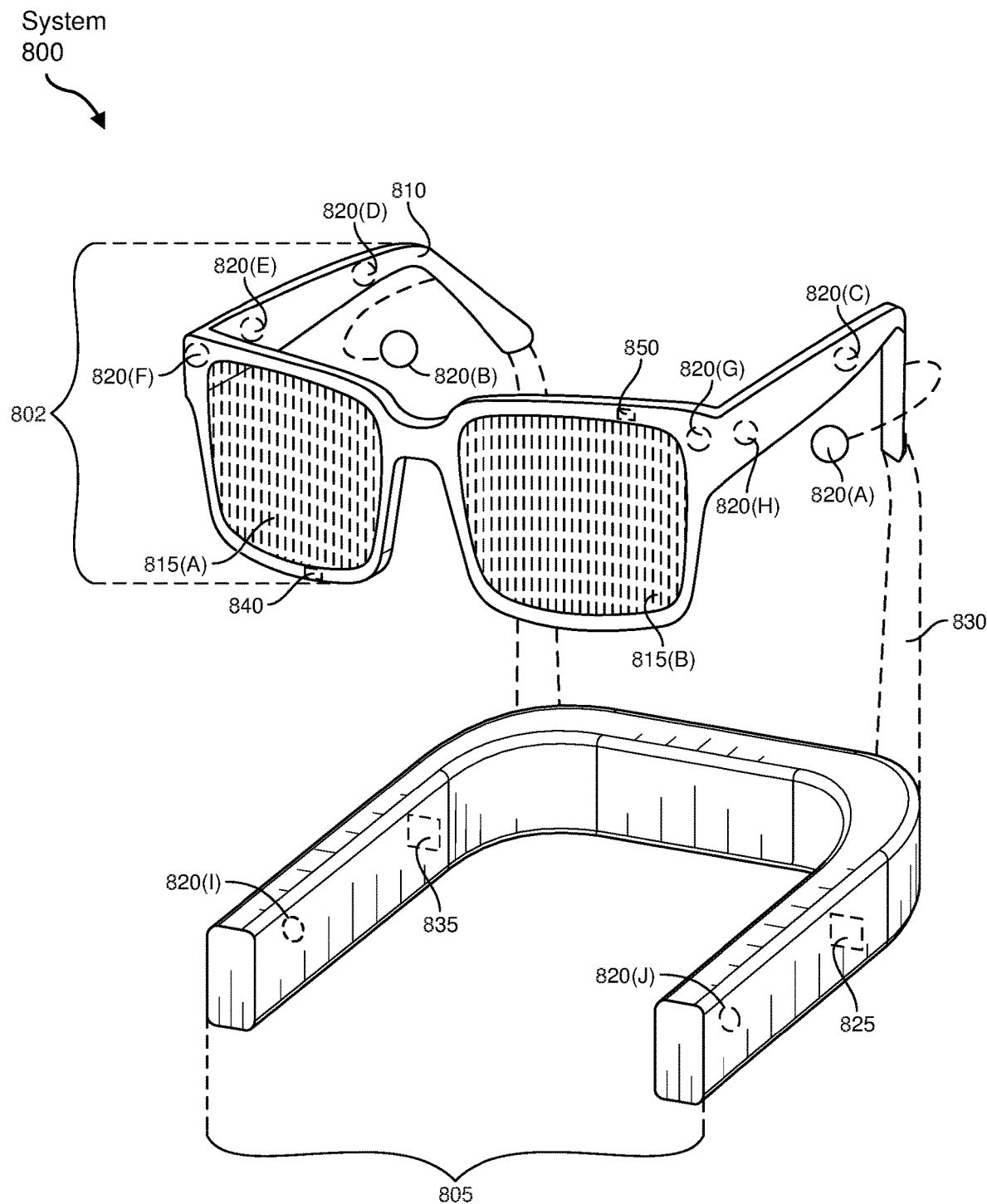
FIG. 8 is a diagram of exemplary augmented-reality glasses that may be used in connection with embodiments of this disclosure.

The embodiments discussed in this disclosure may also be implemented in augmented-reality systems that include one or more NEDs. For example, as shown in FIG. 8, augmented-reality system 800 may include an eyewear device 802 with a frame 810 configured to hold a left display device 815(A) and a right display device 815(B) in front of a user's eyes. Display devices 815(A) and 815(B) may act together or independently to present an image or series of images to a user. While augmented-reality system 800 includes two displays, embodiments of this disclosure may be implemented in augmented-reality systems with a single NED or more than two NEDs.

In some embodiments, augmented-reality system 800 may include one or more sensors, such as sensor 840. Sensor 840 may generate measurement signals in response to motion of augmented-reality system 800 and may be located on substantially any portion of frame 810. Sensor 840 may represent a position sensor, an inertial measurement unit (IMU), a depth camera assembly, or any combination thereof. In some embodiments, augmented-reality system 800 may or may not include sensor 840 or may include more than one sensor. In embodiments in which sensor 840 includes an IMU, the IMU may generate calibration data based on measurement signals from sensor 840. Examples of sensor 840 may include, without limitation, accelerometers, gyroscopes, magnetometers, other suitable types of sensors that detect motion, sensors used for error correction of the IMU, or some combination thereof.

Augmented-reality system 800 may also include a microphone array with a plurality of acoustic transducers 820(A)-820(J), referred to collectively as acoustic transducers 820. Acoustic transducers 820 may be transducers that detect air pressure variations induced by sound waves. Each acoustic transducer 820 may be configured to detect sound and convert the detected sound into an electronic format (e.g., an analog or digital format). The microphone array in FIG. 2 may include, for example, ten acoustic transducers: 820(A) and 820(B), which may be designed to be placed inside a corresponding ear of the user, acoustic transducers 820(C), 820(D), 820(E), 820(F), 820(G), and 820(H), which may be positioned at various locations on frame 810, and/or acoustic transducers 820(1) and 820(J), which may be positioned on a corresponding neckband 805.

In some embodiments, one or more of acoustic transducers 820(A)-(F) may be used as output transducers (e.g., speakers). For example, acoustic transducers 820(A) and/or 820(B) may be earbuds or any other suitable type of headphone or speaker.

The configuration of acoustic transducers 820 of the microphone array may vary. While augmented-reality system 800 is shown in FIG. 8 as having ten acoustic transducers 820, the number of acoustic transducers 820 may be greater or less than ten. In some embodiments, using higher numbers of acoustic transducers 820 may increase the amount of audio information collected and/or the sensitivity and accuracy of the audio information. In contrast, using a lower number of acoustic transducers 820 may decrease the computing power required by a controller 650 to process the collected audio information. In addition, the position of each acoustic transducer 820 of the microphone array may vary. For example, the position of an acoustic transducer 820 may include a defined position on the user, a defined coordinate on frame 810, an orientation associated with each acoustic transducer, or some combination thereof.

Acoustic transducers 820(A) and 820(B) may be positioned on different parts of the user's ear, such as behind the pinna or within the auricle or fossa. Or, there may be additional acoustic transducers on or surrounding the ear in addition to acoustic transducers 820 inside the ear canal. Having an acoustic transducer positioned next to an ear canal of a user may enable the microphone array to collect information on how sounds arrive at the ear canal. By positioning at least two of acoustic transducers 820 on either side of a user's head (e.g., as binaural microphones), augmented-reality device 800 may simulate binaural hearing and capture a 3D stereo sound field around about a user's head. In some embodiments, acoustic transducers 820(A) and 820(B) may be connected to augmented-reality system 800 via a wired connection 830, and in other embodiments, acoustic transducers 820(A) and 820(B) may be connected to augmented-reality system 800 via a wireless connection (e.g., a Bluetooth connection). In still other embodiments, acoustic transducers 820(A) and 820(B) may not be used at all in conjunction with augmented-reality system 800.

Acoustic transducers 820 on frame 810 may be positioned along the length of the temples, across the bridge, above or below display devices 815(A) and 815(B), or some combination thereof. Acoustic transducers 820 may be oriented such that the microphone array is able to detect sounds in a wide range of directions surrounding the user wearing the augmented-reality system 800. In some embodiments, an optimization process may be performed during manufacturing of augmented-reality system 800 to determine relative positioning of each acoustic transducer 820 in the microphone array.

In some examples, augmented-reality system 800 may include or be connected to an external device (e.g., a paired device), such as neckband 805. Neckband 805 generally represents any type or form of paired device. Thus, the following discussion of neckband 805 may also apply to various other paired devices, such as charging cases, smart watches, smart phones, wrist bands, other wearable devices, hand-held controllers, tablet computers, laptop computers and other external compute devices, etc.

As shown, neckband 805 may be coupled to eyewear device 802 via one or more connectors. The connectors may be wired or wireless and may include electrical and/or non-electrical (e.g., structural) components. In some cases, eyewear device 802 and neckband 805 may operate independently without any wired or wireless connection between them. While FIG. 8 illustrates the components of eyewear device 802 and neckband 805 in example locations on eyewear device 802 and neckband 805, the components may be located elsewhere and/or distributed differently on eyewear device 802 and/or neckband 805. In some embodiments, the components of eyewear device 802 and neckband 805 may be located on one or more additional peripheral devices paired with eyewear device 802, neckband 805, or some combination thereof.

Pairing external devices, such as neckband 805, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 800 may be provided by a paired device or shared between a paired device and an eyewear device, thus reducing the weight, heat profile, and form factor of the eyewear device overall while still retaining desired functionality. For example, neckband 805 may allow components that would otherwise be included on an eyewear device to be included in neckband 805 since users may tolerate a heavier weight load on their shoulders than they would tolerate on their heads. Neckband 805 may also have a larger surface area over which to diffuse and disperse heat to the ambient environment. Thus, neckband 805 may allow for greater battery and computation capacity than might otherwise have been possible on a stand-alone eyewear device. Since weight carried in neckband 805 may be less invasive to a user than weight carried in eyewear device 802, a user may tolerate wearing a lighter eyewear device and carrying or wearing the paired device for greater lengths of time than a user would tolerate wearing a heavy standalone eyewear device, thereby enabling users to more fully incorporate artificial reality environments into their day-to-day activities.

Neckband 805 may be communicatively coupled with eyewear device 802 and/or to other devices. These other devices may provide certain functions (e.g., tracking, localizing, depth mapping, processing, storage, etc.) to augmented-reality system 800. In the embodiment of FIG. 8, neckband 805 may include two acoustic transducers (e.g., 820(1) and 820(J)) that are part of the microphone array (or potentially form their own microphone subarray). Neckband 805 may also include a controller 825 and a power source 835.

Acoustic transducers 820(1) and 820(J) of neckband 805 may be configured to detect sound and convert the detected sound into an electronic format (analog or digital). In the embodiment of FIG. 8, acoustic transducers 820(1) and 820(J) may be positioned on neckband 805, thereby increasing the distance between the neckband acoustic transducers 820(1) and 820(J) and other acoustic transducers 820 positioned on eyewear device 802. In some cases, increasing the distance between acoustic transducers 820 of the microphone array may improve the accuracy of beamforming performed via the microphone array. For example, if a sound is detected by acoustic transducers 820(C) and 820(D) and the distance between acoustic transducers 820(C) and 820 (D) is greater than, e.g., the distance between acoustic transducers 820(D) and 820(E), the determined source location of the detected sound may be more accurate than if the sound had been detected by acoustic transducers 820(D) and 820(E).

Controller 825 of neckband 805 may process information generated by the sensors on 805 and/or augmented-reality system 800. For example, controller 825 may process information from the microphone array that describes sounds detected by the microphone array. For each detected sound, controller 825 may perform a direction-of-arrival (DOA) estimation to estimate a direction from which the detected sound arrived at the microphone array. As the microphone array detects sounds, controller 825 may populate an audio data set with the information. In embodiments in which augmented-reality system 800 includes an inertial measurement unit, controller 825 may compute all inertial and spatial calculations from the IMU located on eyewear device 802. A connector may convey information between augmented-reality system 800 and neckband 805 and between augmented-reality system 800 and controller 825. The information may be in the form of optical data, electrical data, wireless data, or any other transmittable data form. Moving the processing of information generated by augmented-reality system 800 to neckband 805 may reduce weight and heat in eyewear device 802, making it more comfortable to the user.

Power source 835 in neckband 805 may provide power to eyewear device 802 and/or to neckband 805. Power source 835 may include, without limitation, lithium ion batteries, lithium-polymer batteries, primary lithium batteries, alkaline batteries, or any other form of power storage. In some cases, power source 835 may be a wired power source. Including power source 835 on neckband 805 instead of on eyewear device 802 may help better distribute the weight and heat generated by power source 835.

As noted, some artificial reality systems may, instead of blending an artificial reality with actual reality, substantially replace one or more of a user's sensory perceptions of the real world with a virtual experience. One example of this type of system is a head-worn display system, such as virtual-reality system 900 in FIG. 9, that mostly or completely covers a user's field of view. Virtual-reality system 900 may include a front rigid body 902 and a band 904 shaped to fit around a user's head. Virtual-reality system 900 may also include output audio transducers 906(A) and 906(B). Furthermore, while not shown in FIG. 9, front rigid body 902 may include one or more electronic elements, including one or more electronic displays, one or more inertial measurement units (IMUS), one or more tracking emitters or detectors, and/or any other suitable device or system for creating an artificial reality experience.

Artificial reality systems may include a variety of types of visual feedback mechanisms. For example, display devices in augmented-reality system 900 and/or virtual-reality system 900 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in augmented-reality system 800 and/or virtual-reality system 900 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, augmented-reality system 700, augmented-reality system 800, and/or virtual-reality system 900 may include one or more optical sensors, such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 7 and 9, output audio transducers 708(A), 708(B), 906(A), and 906(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 710 may include condenser microphones, dynamic microphones, ribbon microphones, and/or any other type or form of input transducer. In some embodiments, a single transducer may be used for both audio input and audio output.

Figure 9:
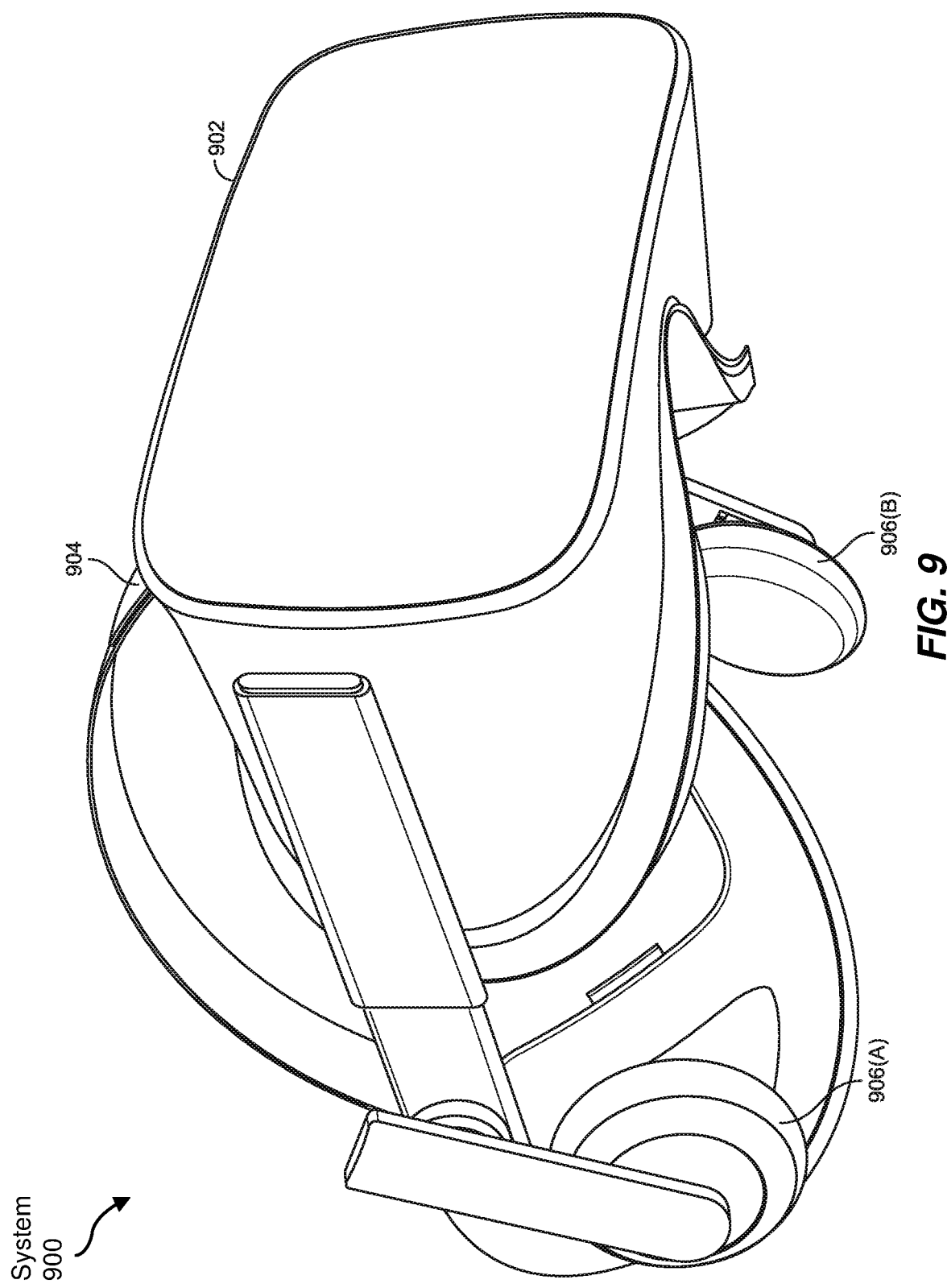
FIG. 9 is a diagram of an exemplary virtual-reality headset that may be used in connection with embodiments of this disclosure.

While not shown in FIGS. 7-9, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

As noted, artificial reality systems 700, 800, and 900 may be used with a variety of other types of devices to provide a more compelling artificial reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 10:
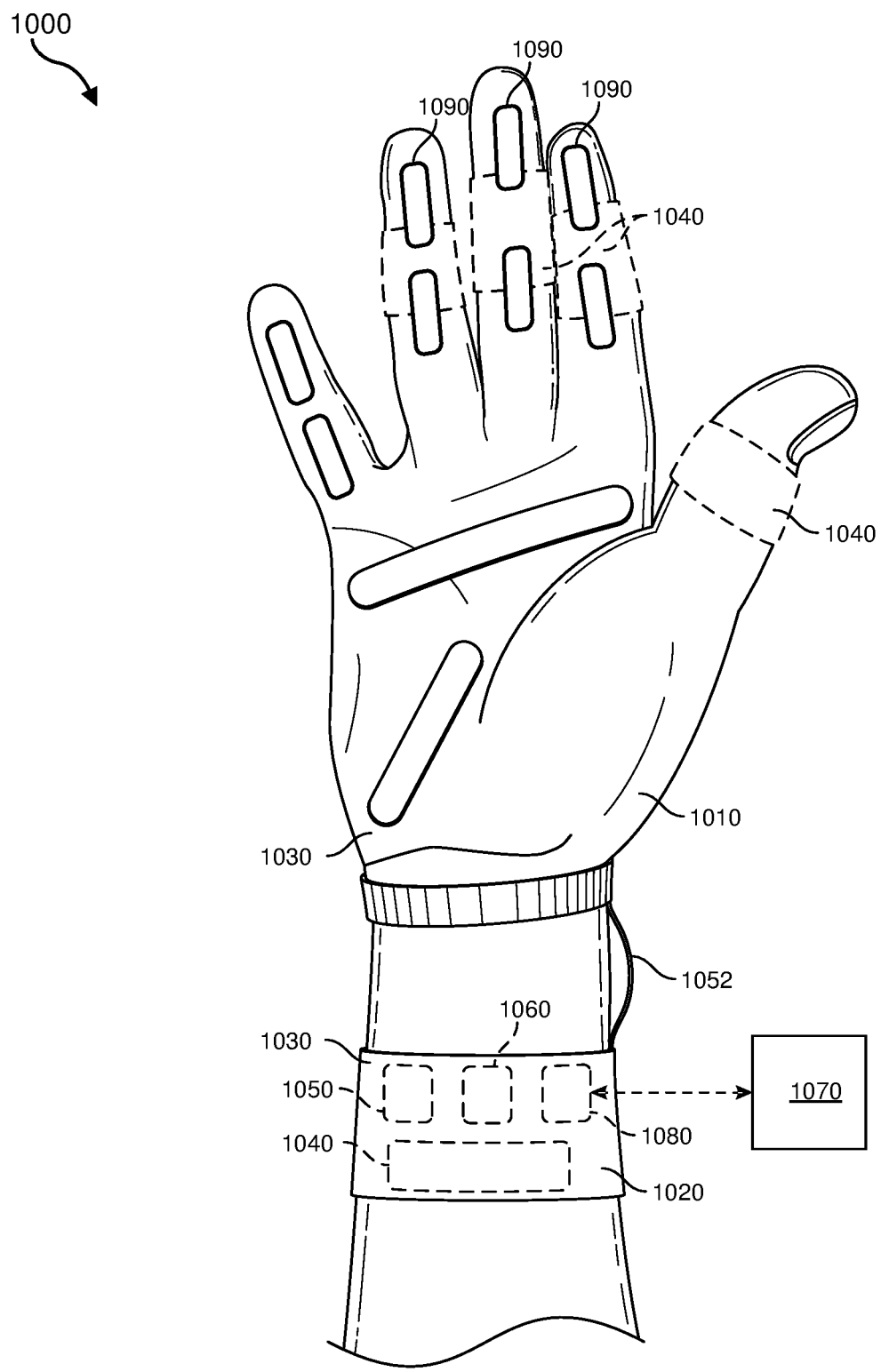
FIG. 10 is a diagram of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 10 illustrates a vibrotactile system 1000 in the form of a wearable glove (haptic device 1010) and wristband (haptic device 1020). Haptic device 1010 and haptic device 1020 are shown as examples of wearable devices that include a flexible, wearable textile material 1030 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, nonwoven fabric, leather, cloth, a flexible polymer material, composite materials, etc.

One or more vibrotactile devices 1040 may be positioned at least partially within one or more corresponding pockets formed in textile material 1030 of vibrotactile system 1000. Vibrotactile devices 1040 may be positioned in locations to provide a vibrating sensation (e.g., haptic feedback) to a user of vibrotactile system 1000. For example, vibrotactile devices 1040 may be positioned to be against the user's finger(s), thumb, or wrist, as shown in FIG. 10. Vibrotactile devices 1040 may, in some examples, be sufficiently flexible to conform to or bend with the user's corresponding body part(s).

A power source 1050 (e.g., a battery) for applying a voltage to the vibrotactile devices 1040 for activation thereof may be electrically coupled to vibrotactile devices 1040, such as via conductive wiring 1052. In some examples, each of vibrotactile devices 1040 may be independently electrically coupled to power source 1050 for individual activation. In some embodiments, a processor 1060 may be operatively coupled to power source 1050 and configured (e.g., programmed) to control activation of vibrotactile devices 1040.

Vibrotactile system 1000 may be implemented in a variety of ways. In some examples, vibrotactile system 1000 may be a standalone system with integral subsystems and components for operation independent of other devices and systems. As another example, vibrotactile system 1000 may be configured for interaction with another device or system 1070. For example, vibrotactile system 1000 may, in some examples, include a communications interface 1080 for receiving and/or sending signals to the other device or system 1070. The other device or system 1070 may be a mobile device, a gaming console, an artificial reality (e.g., virtual reality, augmented reality, mixed reality) device, a personal computer, a tablet computer, a network device (e.g., a modem, a router, etc.), a handheld controller, etc. Communications interface 1080 may enable communications between vibrotactile system 1000 and the other device or system 1070 via a wireless (e.g., Wi-Fi, Bluetooth, cellular, radio, etc.) link or a wired link. If present, communications interface 1080 may be in communication with processor 1060, such as to provide a signal to processor 1060 to activate or deactivate one or more of the vibrotactile devices 1040.

Vibrotactile system 1000 may optionally include other subsystems and components, such as touch-sensitive pads 1090, pressure sensors, motion sensors, position sensors, lighting elements, and/or user interface elements (e.g., an on/off button, a vibration control element, etc.). During use, vibrotactile devices 1040 may be configured to be activated for a variety of different reasons, such as in response to the user's interaction with user interface elements, a signal from the motion or position sensors, a signal from the touch-sensitive pads 1090, a signal from the pressure sensors, a signal from the other device or system 1070, etc.

Although power source 1050, processor 1060, and communications interface 1080 are illustrated in FIG. 10 as being positioned in haptic device 1020, the present disclosure is not so limited. For example, one or more of power source 1050, processor 1060, or communications interface 1080 may be positioned within haptic device 1010 or within another wearable textile.

Figure 11:
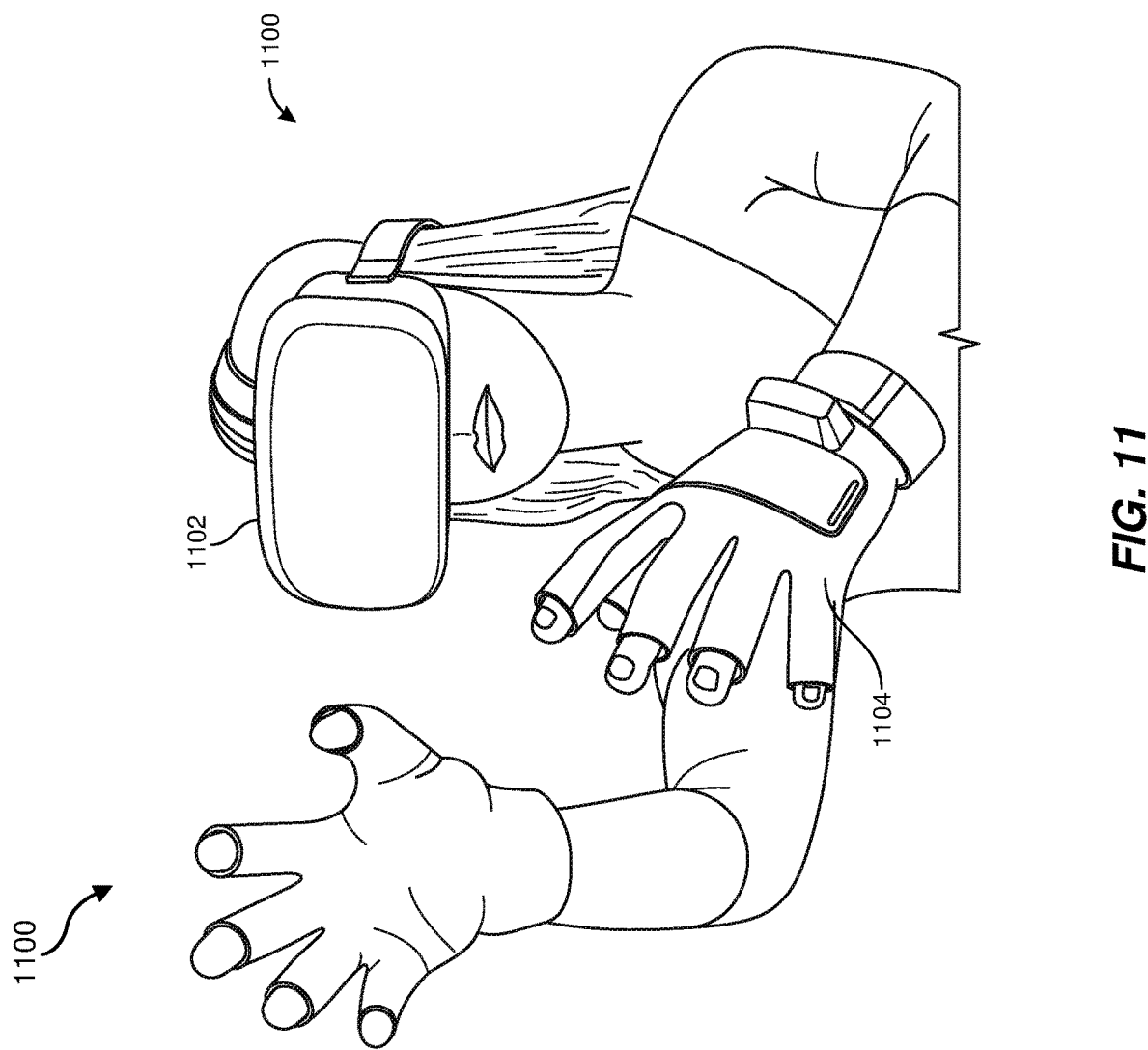
FIG. 11 is a diagram of an exemplary virtual-reality environment according to embodiments of this disclosure.

Haptic wearables, such as those shown in and described in connection with FIG. 10, may be implemented in a variety of types of artificial-reality systems and environments. FIG. 11 shows an example artificial reality environment 1100 including one head-mounted virtual-reality display and two haptic devices (i.e., gloves), and in other embodiments any number and/or combination of these components and other components may be included in an artificial reality system. For example, in some embodiments there may be multiple head-mounted displays each having an associated haptic device, with each head-mounted display and each haptic device communicating with the same console, portable computing device, or other computing system.

Head-mounted display 1102 generally represents any type or form of virtual-reality system, such as virtual-reality system 900 in FIG. 9. Haptic device 1104 generally represents any type or form of wearable device, worn by a use of an artificial reality system, that provides haptic feedback to the user to give the user the perception that he or she is physically engaging with a virtual object. In some embodiments, haptic device 1104 may provide haptic feedback by applying vibration, motion, and/or force to the user. For example, haptic device 1104 may limit or augment a user's movement. To give a specific example, haptic device 1104 may limit a user's hand from moving forward so that the user has the perception that his or her hand has come in physical contact with a virtual wall. In this specific example, one or more actuators within the haptic advice may achieve the physical-movement restriction by pumping fluid into an inflatable bladder of the haptic device. In some examples, a user may also use haptic device 1104 to send action requests to a console. Examples of action requests include, without limitation, requests to start an application and/or end the application and/or requests to perform a particular action within the application.

Figure 12:
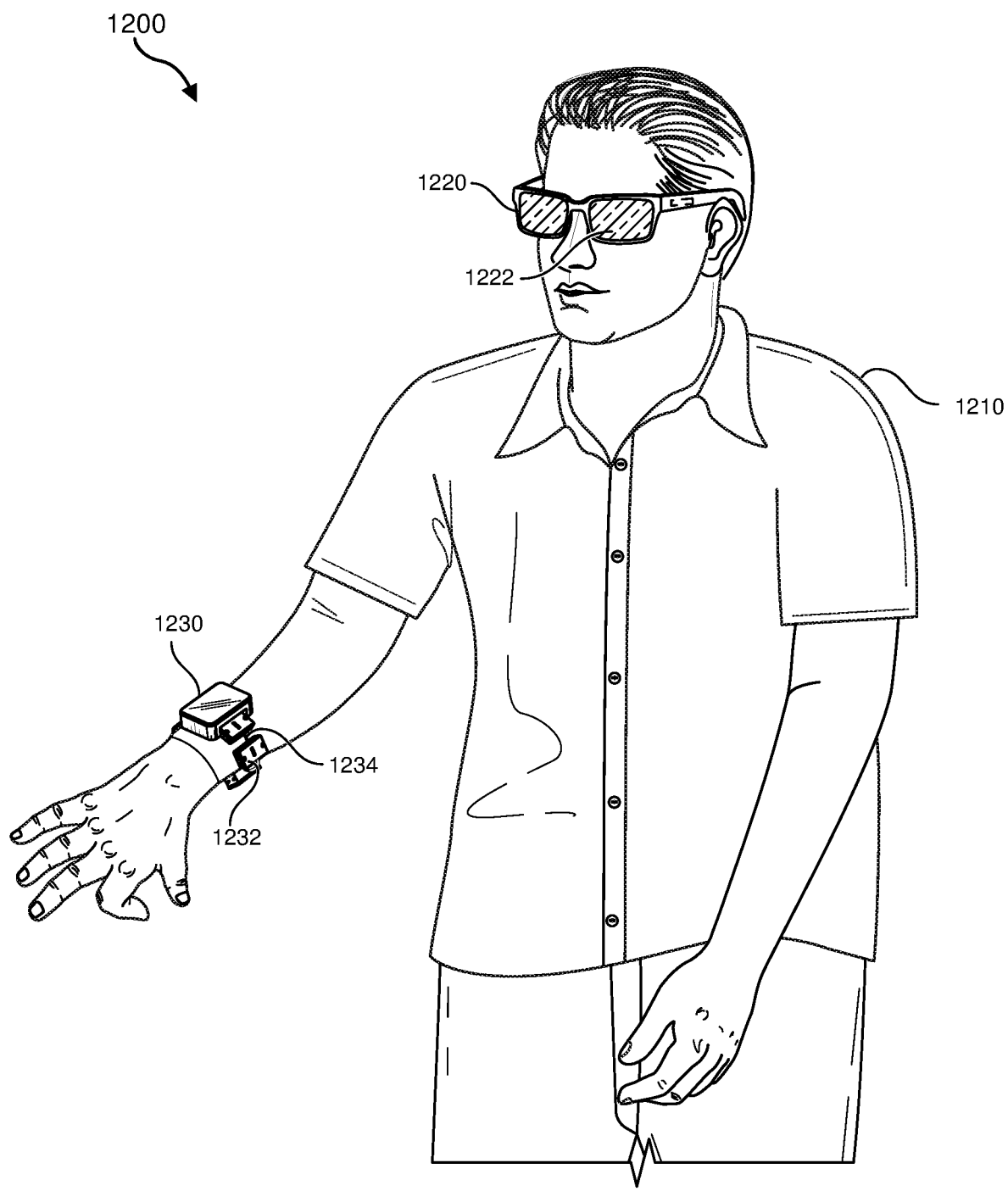
FIG. 12 is a diagram of an exemplary augmented-reality environment according to embodiments of this disclosure.

While haptic interfaces may be used with virtual-reality systems, as shown in FIG. 11, haptic interfaces may also be used with augmented-reality systems, as shown in FIG. 12. FIG. 12 is a perspective view a user 1210 interacting with an augmented-reality system 1200. In this example, user 1210 may wear a pair of augmented-reality glasses 1220 that have one or more displays 1222 and that are paired with a haptic device 1230. Haptic device 1230 may be a wristband that includes a plurality of band elements 1232 and a tensioning mechanism 1234 that connects band elements 1232 to one another.

One or more of band elements 1232 may include any type or form of actuator suitable for providing haptic feedback. For example, one or more of band elements 1232 may be configured to provide one or more of various types of cutaneous feedback, including vibration, force, traction, texture, and/or temperature. To provide such feedback, band elements 1232 may include one or more of various types of actuators. In one example, each of band elements 1232 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 1010, 1020, 1104, and 1230 may include any suitable number and/or type of haptic transducer, sensor, and/or feedback mechanism. For example, haptic devices 1010, 1020, 1104, and 1230 may include one or more mechanical transducers, piezoelectric transducers, and/or fluidic transducers. Haptic devices 1010, 1020, 1104, and 1230 may also include various combinations of different types and forms of transducers that work together or independently to enhance a user's artificial-reality experience. In one example, each of band elements 1232 of haptic device 1230 may include a vibrotactor (e.g., a vibrotactile actuator) configured to vibrate in unison or independently to provide one or more of various types of haptic sensations to a user.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the systems described herein may transform data, physical devices, and/or representations of physical devices from one form to another. For example, one or more of the systems recited herein may receive materials to be transformed, may transform the materials into a fluidic valve, and/or may incorporate the fluidic valve into a haptics device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Example 1: A fluidic device comprising a chamber, an inlet port coupled to the chamber and configured to convey fluid to the chamber, and an outlet port coupled to the chamber and configured to convey the fluid from the chamber. The fluidic device may also comprise a restricting region that (1) is dimensioned to restrict a flow of the fluid through the outlet port when the pressure in the chamber is below a threshold level and (2) is configured to move in a manner that allows a flow rate of the fluid through the outlet port to increase when pressure in the chamber reaches the threshold level.

Example 2: The fluidic device of example 1, further comprising a controller that controls a flow rate of the fluid at the inlet port, wherein (1) the controller is coupled to an artificial reality system programmed to create an artificial reality for the user, and (2) the controller is configured to change the flow rate at the inlet port in response to activity within the artificial reality.

Example 3: The fluidic device of any of examples 1 and 2, wherein (1) the restricting region comprises an elastic membrane, (2) when pressure in the chamber reaches the threshold level, movement of the restricting region comprises deformation of the elastic membrane, and (3) deformation of the elastic membrane provides the tactile feedback in response to activity within an artificial reality.

Example 4: The fluidic device of example 3, wherein the controller is configured to cause the flow rate to be at least substantially continuous over a period of time such that the following cycle recurs throughout the period of time (1) the pressure in the chamber increases due to restricted flow at the restricting region, (2) the pressure in the chamber reaches the threshold and causes the restricting region to move in the manner that allows the flow rate of the fluid to increase through the outlet port, (3) the flow rate of the fluid through the outlet port causes the pressure in the chamber to decrease and fall below the threshold level, (4) the decrease in pressure in the chamber causes the restricting region to move in a manner that reduces the flow rate of the fluid through the outlet port, and (5) periodic movement of the restricting region causes the elastic membrane to vibrate and function as a vibrotactor.

Example 5: The fluidic device of example 4, wherein the restricting region is configured such that the change in the input flow affects at least one of a frequency of the vibration of the elastic membrane or a magnitude of the vibration of the elastic membrane.

Example 6: The fluidic device of any of examples 1-5, wherein the restricting region is coupled to a cutaneous interface dimensioned to contact skin of a user.

Example 7: The fluidic device of example 6, wherein the cutaneous interface comprises a wearable device dimensioned to be worn by the user.

Example 8: The fluidic device of example any of examples 3-7, wherein the outlet port comprises an opening in the elastic membrane.

Example 9: The fluidic device of any of examples 1-7, wherein the outlet port comprises an opening in the chamber that, when pressure in the chamber is below the threshold level, is at least partially blocked.

Example 10: The fluidic device of any of examples 1-2, wherein, when the flow rate at the inlet port is at least substantially continuous over a period of time, the following cycle recurs throughout the period of time: (1) the pressure in the chamber increases due to restricted flow at the restricting region, (2) the pressure in the chamber reaches the threshold level and causes the restricting region to move in the manner that allows the flow rate of the fluid to increase through the outlet port, (3) the flow rate of the fluid through the outlet port causes the pressure in the chamber to decrease and fall below the threshold level, and (4) the decrease in pressure in the chamber causes the restricting region to move in a manner that reduces the flow rate of the fluid through the outlet port, wherein periodic increases and decreases of flow through the outlet port provide fluidic oscillations to a downstream device that is downstream from the outlet port.

Example 11: The fluidic device of example 10, wherein the downstream device comprises a fluidic vibrotactor that is actuated by the periodic increases and decreases of flow through the outlet port.

Example 12: The fluidic device of claim 10, wherein the periodic increases and decreases of flow through the outlet port enable the fluidic device to function as a fluidic oscillation regulator to the downstream device.

Example 13: An artificial reality system comprising a fluidic device. The fluidic device may comprise a chamber, an inlet port coupled to the chamber and configured to convey fluid to the chamber, and an outlet port coupled to the chamber and configured to convey the fluid from the chamber. The fluidic device may also comprise a restricting region that (1) is dimensioned to restrict a flow of the fluid through the outlet port when the pressure in the chamber is below a threshold level and (2) is configured to move in a manner that allows a flow rate of the fluid through the outlet port to increase when pressure in the chamber reaches the threshold level. The artificial reality system may also include a controller that controls a flow rate of the fluid through the inlet port, wherein the controller is configured to change the input flow in response to create, at least in part, an artificial reality for a user.

Example 14: The artificial reality system of example 13, wherein the fluidic device comprises a wearable device.

Example 15: The artificial reality system of any of examples 10-14, wherein the controller is configured to cause the flow rate to be at least substantially continuous over a period of time such that the following cycle recurs throughout the period of time: (1) the pressure in the chamber increases due to restricted flow at the restricting region, (2) the pressure in the chamber reaches the threshold and causes the restricting region to move in the manner that allows the flow rate of the fluid to increase through the outlet port, (3) the flow rate of the fluid through the outlet port causes the pressure in the chamber to decrease and fall below the threshold level, (4) the decrease in pressure in the chamber causes the restricting region to move in a manner that reduces the flow rate of the fluid through the outlet port, and (5) periodic movement of the restricting region causes the fluidic device to function as a vibrotactor.

Example 16: The artificial-reality system of any of examples 10-15, wherein the outlet port comprises an opening in an elastic membrane of the restricting region.

Example 17: The artificial-reality system of any of examples 11-16, wherein the outlet port comprises an opening in the chamber that, when pressure in the chamber is below the threshold level, is at least partially blocked.

Example 18: A method comprising (1) coupling an inlet port to a chamber such that the inlet port is configured to convey fluid to the chamber, (2) coupling an outlet port to the chamber such that the outlet port is configured to convey fluid from the chamber, (3) providing a restricting region that (a) is dimensioned to restrict a flow of the fluid through the outlet port when the pressure in the chamber is below a threshold level and (b) is configured to move in a manner that allows a flow rate of the fluid through the outlet port to increase when pressure in the chamber reaches the threshold level.

Example 19: The method of example 18, further comprising coupling the restring region to a cutaneous interface of a wearable device.

Example 20: The method of example 18 or 19, further comprising coupling a fluidic source channel to the inlet port.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A fluidic device comprising:
   a chamber;
   an inlet port configured to convey fluid to the chamber;
   an outlet port configured to convey the fluid from the chamber;
   a restricting region that:
   is dimensioned to restrict a flow of the fluid through the outlet port when pressure in the chamber is below a threshold level; and
   is configured to move in a manner that allows a flow rate of the fluid through the outlet port to increase when pressure in the chamber reaches the threshold level; and
   a controller that controls a flow rate of the fluid through the inlet port, wherein the controller is configured to change the flow rate in response to activity within an artificial reality provided to a user.

2. The fluidic device of claim 1, wherein:
   the controller is coupled to an artificial reality system programmed to create the artificial reality.

3. The fluidic device of claim 1, wherein:
   the restricting region comprises an elastic membrane;
   when pressure in the chamber reaches the threshold level, movement of the restricting region comprises deformation of the elastic membrane; and
   deformation of the elastic membrane provides tactile feedback in response to activity within an artificial reality.

4. The fluidic device of claim 3, wherein, when the flow rate at the inlet port is at least substantially continuous over a period of time, the following cycle recurs throughout the period of time:
   the pressure in the chamber increases due to restricted flow at the restricting region;
   the pressure in the chamber reaches the threshold level and causes the restricting region to move in the manner that allows the flow rate of the fluid to increase through the outlet port;
   the flow rate of the fluid through the outlet port causes the pressure in the chamber to decrease and fall below the threshold level; and
   the decrease in pressure in the chamber causes the restricting region to move in a manner that reduces the flow rate of the fluid through the outlet port, wherein periodic increases and decreases of pressure in the chamber cause the elastic membrane to vibrate and function as a vibrotactor.

5. The fluidic device of claim 4, wherein the restricting region is configured such that a change in the flow rate at the inlet port affects at least one of:
   a frequency of vibration of the elastic membrane; or
   a magnitude of vibration of the elastic membrane.

6. The fluidic device of claim 3, wherein the elastic membrane is coupled to a cutaneous interface dimensioned to contact skin of a user.

7. The fluidic device of claim 6, wherein the cutaneous interface comprises a wearable device dimensioned to be worn by the user.

8. The fluidic device of claim 3, wherein the outlet port comprises an opening in the elastic membrane.

9. The fluidic device of claim 3, wherein the outlet port comprises an opening in the chamber that, when pressure in the chamber is below the threshold level, is at least partially blocked by the elastic membrane.

10. The fluidic device of claim 1, wherein, when the flow rate at the inlet port is at least substantially continuous over a period of time, the following cycle recurs throughout the period of time:
   the pressure in the chamber increases due to restricted flow at the restricting region;

the pressure in the chamber reaches the threshold level and causes the restricting region to move in the manner that allows the flow rate of the fluid to increase through the outlet port;

the flow rate of the fluid through the outlet port causes the pressure in the chamber to decrease and fall below the threshold level; and the decrease in pressure in the chamber causes the restricting region to move in a manner that reduces the flow rate of the fluid through the outlet port, wherein periodic increases and decreases of flow through the outlet port provide fluidic oscillations to a downstream device that is downstream from the outlet port.

11. The fluidic device of claim 10, wherein the downstream device comprises a fluidic vibrotactor that is actuated by the periodic increases and decreases of flow through the outlet port.

12. The fluidic device of claim 10, wherein the periodic increases and decreases of flow through the outlet port enable the fluidic device to function as a fluidic oscillating regulator to the downstream device.

13. An artificial reality system comprising:
a fluidic device comprising:
   a chamber;
   an inlet port configured to convey fluid to the chamber;
   an outlet port configured to convey the fluid from the chamber; and
   a restricting region that:
      is dimensioned to restrict a flow of the fluid through the outlet port when pressure in the chamber is below a threshold level; and
      is configured to move in a manner that allows a flow rate of the fluid through the outlet port to increase when pressure in the chamber reaches the threshold level; and
a controller that controls a flow rate of the fluid through the inlet port, wherein the controller is configured to change the flow rate in response to activity within an artificial reality provided to a user.

14. The artificial reality system of claim 13, wherein the fluidic device comprises a wearable device.

15. The artificial reality system of claim 13, wherein:
the controller is configured to cause the flow rate to be at least substantially continuous over a period of time such that the following cycle recurs throughout the period of time:
   the pressure in the chamber increases due to restricted flow at the restricting region;
   the pressure in the chamber reaches the threshold level and causes the restricting region to move in the manner that allows the flow rate of the fluid to increase through the outlet port;
   the flow rate of the fluid through the outlet port causes the pressure in the chamber to decrease and fall below the threshold level; and
   the decrease in pressure in the chamber causes the restricting region to move in a manner that reduces the flow rate of the fluid through the outlet port; and
periodic movement of the restricting region causes the fluidic device to function as a vibrotactor.

16. The artificial reality system of claim 13, wherein the outlet port comprises an opening in an elastic membrane of the restricting region.

17. The artificial reality system of claim 13, wherein the outlet port comprises an opening in the chamber that, when pressure in the chamber is below the threshold level, is at least partially blocked.

18. A method comprising:
coupling an inlet port to a chamber such that the inlet port is configured to convey fluid to the chamber;
coupling an outlet port to the chamber such that the outlet port is configured to convey fluid from the chamber;
providing a restricting region that:
   is dimensioned to restrict a flow of the fluid through the outlet port when pressure in the chamber is below a threshold level; and
   is configured to move in a manner that allows a flow rate of the fluid through the outlet port to increase when pressure in the chamber reaches the threshold level; and
coupling a controller to the restricting region to control a flow rate of fluid through the inlet port, wherein the controller is configured to change the flow rate in response to activity within an artificial reality provided to a user.

19. The method of claim 18, further comprising coupling the restricting region to a cutaneous interface of a wearable device.

20. The method of claim 18, further comprising coupling a fluidic source channel to the inlet port.

* * * * *